UNITED STATES PATENT OFFICE.

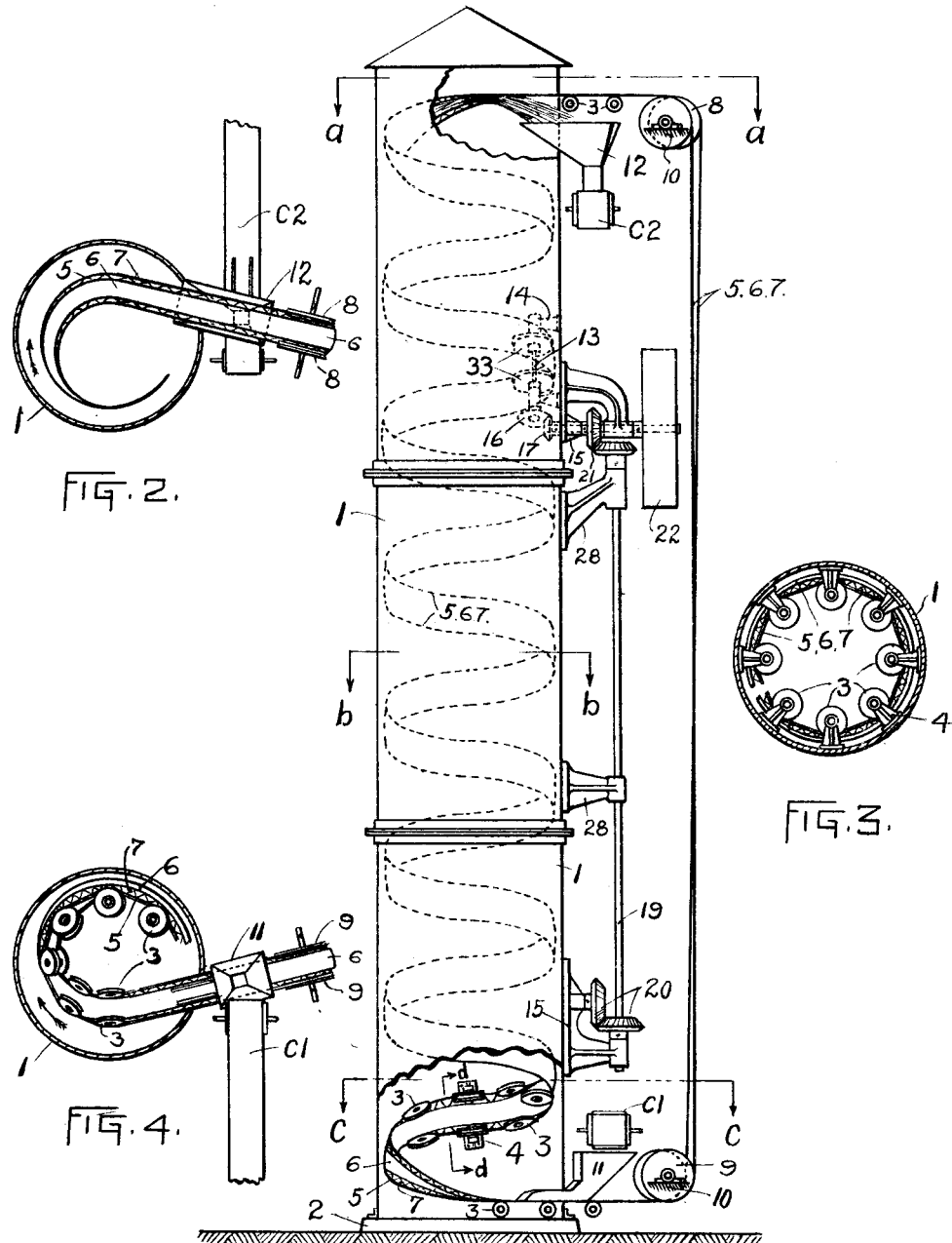

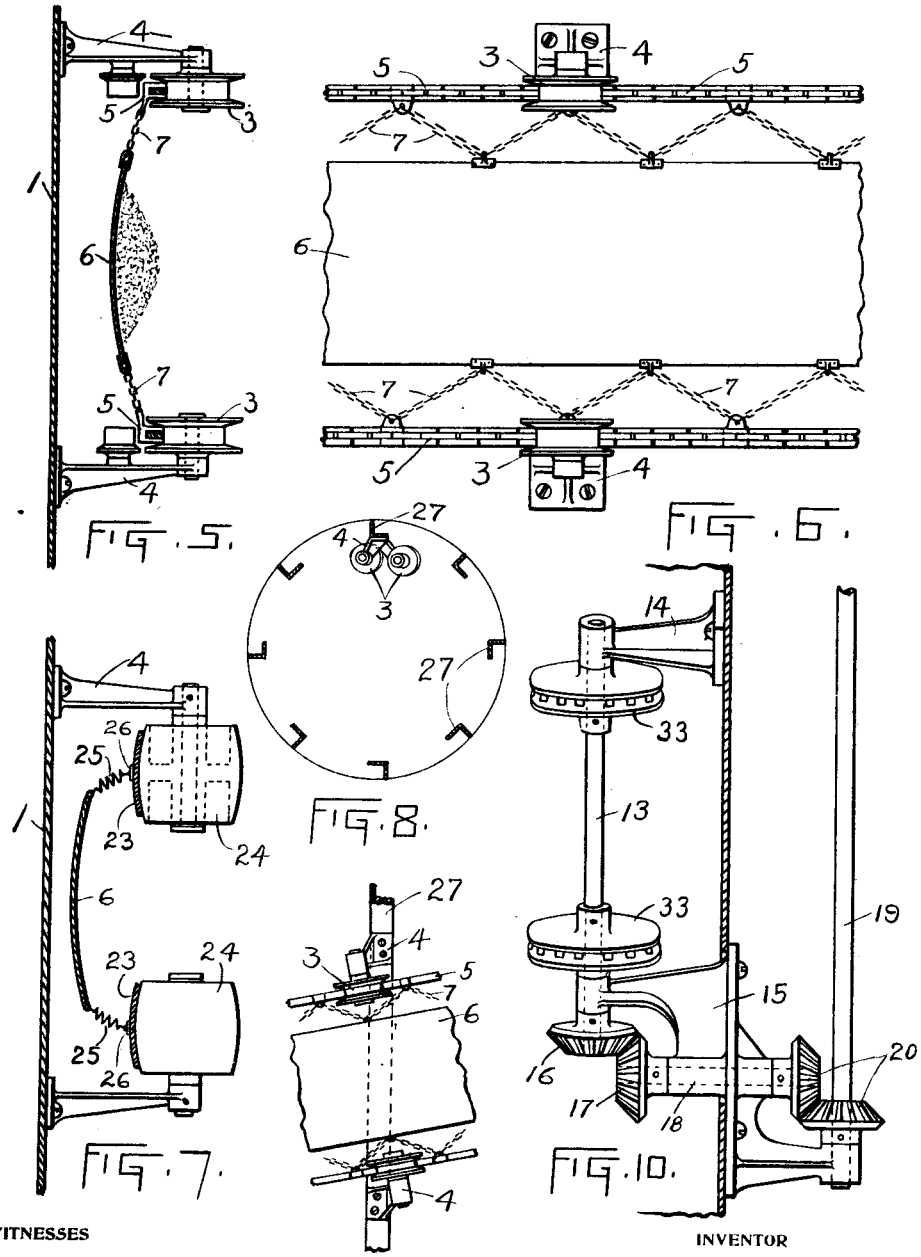

MILTON T. WESTON, OF NEW YORK, N. Y.

BELT CONVEYER.

1,226,730.   Specification of Letters Patent.   Patented May 22, 1917.

Application filed June 13, 1912.   Serial No. 703,434.

*To all whom it may concern:*

Be it known that I, MILTON T. WESTON, citizen of the United States, and resident of New York, in the county of New York and State of New York, have invented certain new and useful Improvements in Belt Conveyers, of which the following is a specification.

My invention relates to improvements in belt conveyers wherein the conveying member is caused to travel spirally in substantially a vertical direction instead of on an incline, as has heretofore been the practice when the material conveyed was also to be elevated, and wherein centrifugal force, instead of gravity, is utilized to keep the material on the conveying member.

The principal object of my invention is to provide an apparatus which will occupy much less space than the inclined type of conveyer and which is much less expensive to construct. Further objects are simplicity of construction, durability and economy in operation.

My invention is fully illustrated in the accompanying drawings in which,

Figure 1, is a side view of the complete apparatus.

Fig. 2, is a sectional view on a line $a-a$ of Fig. 1.

Fig. 3, is a sectional view on a line $b-b$ of Fig. 1.

Fig. 4, is a sectional view on a line $c-c$ of Fig. 1.

Fig. 5, is an enlarged sectional view of the conveying member and its supporting idlers, taken substantially on a line $d-d$ of Fig. 1.

Fig. 6, is an enlarged partial front view of the conveying member and supporting idlers, being substantially a front view of Fig. 5.

Fig. 7, is a view similar to Fig. 5, showing a slight modification in the conveying member and its supporting idlers.

Fig. 8, is a sectional view of my apparatus showing a modification in the method of supporting the idlers.

Fig. 9, is a partial front view illustrating one method of mounting the idlers shown in Fig. 8.

Fig. 10 is an enlarged side view of one of the two driving means shown in Fig. 1.

Similar numbers refer to similar parts in the several views.

The preferred form of my invention is shown in Fig. 1, wherein a cylindrical support 1, of suitable construction, is mounted vertically on a foundation 2. Idlers 3, on brackets, 4, are mounted on the interior surface of the cylindrical support 1, substantially in spiral order, so as to cause the conveying member 5, 6, 7 carried thereby, to travel in a spiral direction when driven in the manner hereinafter described. The conveying member 5, 6, 7 is endless and enters toward the bottom of the cylindrical support 1 and is gradually turned from its horizontal position to a vertical position, transversely, by the special arrangement of idlers 3 shown in Figs. 1 and 4. A similar arrangement of idlers 3 is used at the top where the conveying member leaves the cylindrical support 1 and is returned to the horizontal position. The path of the belt in returning to its horizontal position is illustrated in Fig. 2, the idlers being omitted. Idlers 8 and 9, on supports 10, serve to return the conveying member 5, 6, 7 to the base of the support 1 where it passes under a suitable loading hopper or chute 11.

The conveying member 5, 6, 7, just referred to, is preferably composed of two traction members 5 which engage and are carried by the idlers 3 and a central carrying member 6 which is flexibly supported between the two traction members 5 by means of chains 7 or by yielding means, as for example the coiled springs 25 shown in Fig. 7.

Material to be elevated is delivered to the chute 11 in any approved manner, as by the conveyer $C^1$, and passes to the carrying member 6 while still in its horizontal position. As the conveying member 5, 6, 7 begins to assume a transverse vertical position, which is maintained throughout its travel in the support 1, centrifugal force acts upon the material to hold it on the carrying member 6 until it reaches the top of the support 1 where the conveying member again assumes a horizontal position but with the carrying side down. There being no centrifugal force in this position, obviously the material will drop from the belt by gravity, into a suitable chute 12 arranged to receive it and will be taken away in any approved manner, as by a conveyer $C^2$ shown in Figs. 1 and 2.

The object of the construction of the conveying member 5, 6, 7, as previously described, can best be explained by referring to Fig. 3 where it will be seen that the traction members 5, being driven, will travel substantially in a straight line between any two idlers 3 and will form angles as they pass over said idlers. Obviously if the carrying member 6 were to travel in this path, some of the material would be thrown off as it passes each pair of idlers for centrifugal force would be momentarily overcome at each of these points. To obviate this difficulty I suspend the carrying member between the traction members, in substantially the manner described, so that it may be free to assume a true spiral form under the influence of centrifugal force and be supported by those chains or connections 7 or 25 which are taut at the moment.

The above principle of a conveyer traveling in a spiral direction and the material being held in place thereon by centrifugal force, I believe to be broadly new.

The conveying member 5, 6, 7 is preferably driven in the following manner as illustrated in Figs. 1 and 10. A pair of sprocket driving wheels 33, mounted on a driven shaft 13, is substituted for any pair of idlers 3. In Fig. 1 there are two pairs of these sprocket driving wheels 33 used, the pair at the top being shown in dotted lines and the ones at the bottom being detailed in Fig. 10. More than this number may be used however, if the conveyer is very high. The shafts 13 are mounted in brackets 14 and 15 attached to the support 1. On one end of each shaft 13 is secured a bevel gear 16, engaging another bevel gear 17, mounted on one end of a horizontal shaft 18, which is driven from a main shaft 19, by means of gearing 20. The main shaft 19, supported by brackets 28, attached to the support 1, is driven by means of gearing 21, and pulley 22, from any suitable source of power. Plainly there are many modifications of the mechanical arrangement of this method of driving the conveyer but the above will serve to illustrate one suitable method. If the conveyer is a short one either pair of return idlers 8 or 9, driven from a source of power, may be used to drive the conveyer instead of the above described arrangement.

A modification of the conveying member is shown in Fig. 7. While I prefer the use of link belts for the traction members I do not wish to limit myself to their use only, as it may be desirable in many cases to use other means as, for example, belts 23 illustrated in Fig. 7. These belts 23, carried by idler pulleys 24, support the carrying belt 6 by means of the coiled springs 25, attached to the clips 26, which are secured to the belts.

Figs. 8 and 9 show a modification of the method of supporting the brackets 4 and idlers 3 and is suitable for indoor construction. A skeleton frame work 27 is used instead of the cylindrical support 1.

Having thus described my invention I claim as new:

1. In a conveyer of the type described the combination of a suitable support, of carrying idlers arranged in two spiral rows thereon, each of said spiral rows having one or more complete convolutions and a conveying means carried by said idlers.

2. In a conveyer of the type described the combination of a suitable support having carrying idlers mounted in double spiral order thereon, the axes of said carrying idlers being elements of a cylindrical surface, of conveying means adapted to travel on said carrying idlers and a driving means engaging the conveying means to cause same to travel on the carrying idlers.

3. In a conveyer of the type described the combination of a driving means, of a conveying means driven by said driving means and supporting means which cause the conveying means to travel in a spiral path with its carrying surface in a vertical position.

4. In a conveyer of the type described the combination of a conveying means, of a cylindrical support, of carrying idlers mounted on the inner surface of said support in such a manner as to cause the conveying means to change from a horizontal to a vertical position, transversely, and also to travel in a spiral direction within the support and a plural driving means engaging the conveying means to cause same to travel on the carrying idlers.

5. In a conveyer the combination of a suitable support having two rows of carrying idlers arranged in parallel spiral order thereon, the axes of said carrying idlers being elements of a cylindrical surface, of a conveying belt having suitable edges for engaging said carrying idlers and a driving means engaging the edges of the conveying belt to cause same to travel on the carrying idlers.

6. In a conveyer the combination of a suitable support with carrying idlers arranged spirally thereon, of an endless conveying member consisting of a belt or web portion flexibly connected to and supported between two traction members which are adapted to engage and to be carried by said carrying idlers and a driving means engaging the traction members to cause the conveying member to travel on the carrying idlers.

7. In a conveyer the combination, with a suitable support having two sets of carrying idlers mounted spirally and in parallel order thereon, of two traction members adapted to engage and roll on said carrying idlers, of a conveying means flexibly supported between the two traction members in a manner to permit same to "float" and to assume a true spiral form under the influence of centrifugal force and means for driving the traction members.

8. In a belt conveyer the combination of a conveying member traveling in a spiral path with its carrying surface substantially parallel to the axis of the spiral, of means for maintaining the conveying member in said path, of means for holding the material on the vertical carrying surface of the conveying member and driving means for the conveying member.

9. In a conveyer, a suitable support on which is mounted two rows of carrying idlers arranged in parallel order, of a conveying member carried by said idlers and adapted to travel at a velocity which causes centrifugal force to act and hold the material on the conveying surface of the conveying member, means for delivering material to the conveying number, means for receiving material from the conveying member and driving means for the conveying member.

10. In a conveying belt the combination of a central carrying web member, of two outer traction members and a flexible means for connecting the central carrying web member to the two outer traction members.

MILTON T. WESTON.

Witnesses:
F. BLUMENSON,
G. BERNARD.

Copies of this patent may be obtained for five cents each, by addressing the "Commissioner of Patents, Washington, D. C."